3,014,861
TREATMENT OF IMMISCIBLE LIQUIDS
Weigert C. Buningh, Amsterdam, Netherlands, assignor to Shell Oil Company, New York, N.Y., a corporation of Delaware
Filed July 8, 1959, Ser. No. 825,778
Claims priority, application Netherlands July 14, 1958
2 Claims. (Cl. 208—287)

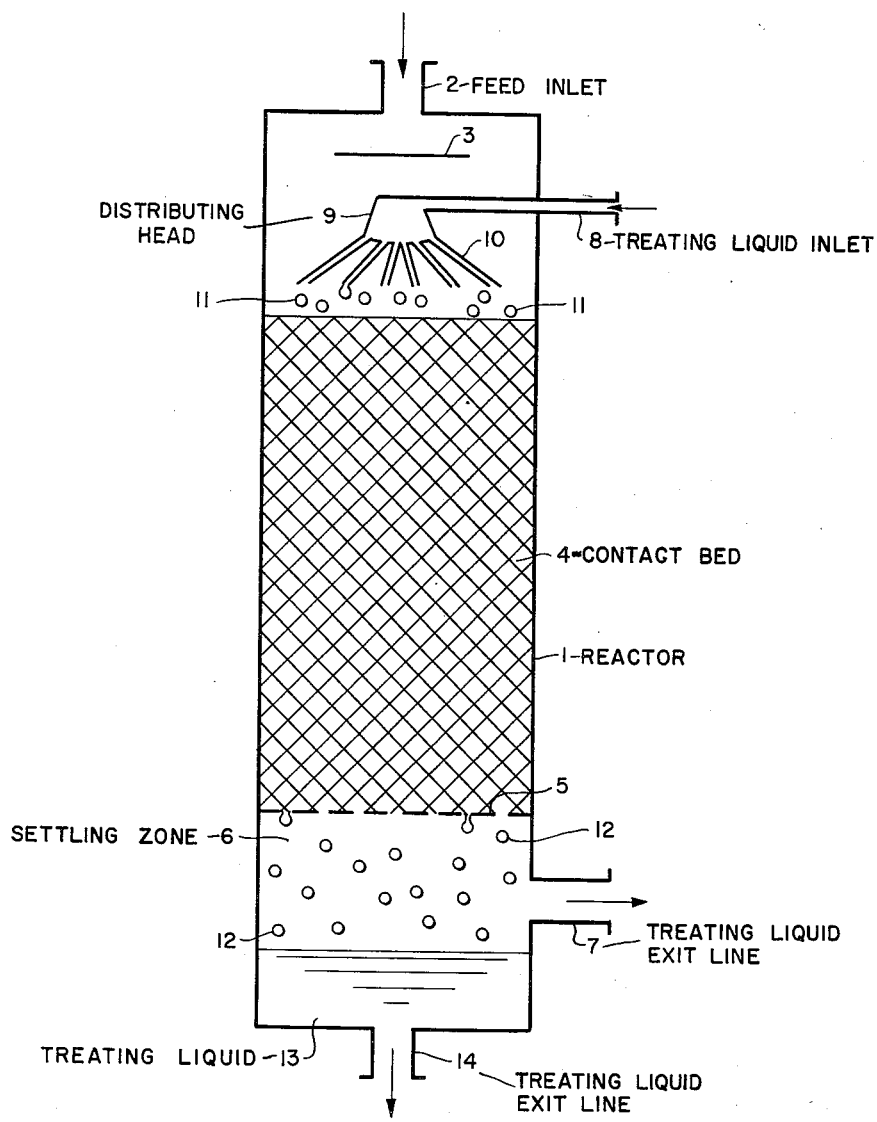

The invention relates to a process for the continuous treatment of a first liquid with a second liquid, which is immiscible therewith.

It is conventional practice to treat a liquid with a second liquid which is immiscible therewith by dispersing one liquid in the other. The two admixed liquids are then separated as well as possible. Frequently, the treating liquid will after separation still contain a minor quantity of the liquid to be treated in dispersed form. If this treating liquid is then discarded the dispersed liquid to be treated is lost. If complete removal of the liquid to be treated from the treating liquid is desired expensive separators such as coalescers have been employed, but even with the use of this equipment the dispersion is often quite difficult to remove. It is also possible that the treated liquid still contains minor quantities of the treating liquid in dispersed form. In order to remove the treated liquid from the treating liquid, the mixture may again be passed through a coalescer.

In view of the shortcomings commonly associated with the use of coalescers and the like for the complete separation of the two liquids, various processes have been suggested to prevent the treating liquid from becoming finely dispersed in the liquid to be treated.

For example, a process has been proposed in the British patent specification No. 786,430 in which the treatment is carried out in at least two stages. In each stage the hydrocarbon liquid is intimately mixed with the treating liquid so as to form a dispersion. In the final stage the hydrocarbon liquid undergoing treatment is present in smaller quantities than the aqueous treating liquid, and in the preceding stage the treating liquid is present in a smaller quantity than the hydrocarbon liquid undergoing treatment. After the mixture has been allowed to stand for some time a clear hydrocarbon layer and a turbid aqueous layer are obtained in the final stage. The turbidity of the aqueous layer is caused by traces of hydrocarbons from the liquid undergoing treatment. The aqueous layer may be recycled as for treatment of further quantities of the hydrocarbons.

It has also been proposed to pass two immiscible liquids, a hydrocarbon oil and an aqueous alkali metal hydroxide solution, upwardly through a contact bed of solid inert material at a hydrocarbon oil flow rate in the range of 0.1–3 cm./sec. In this known process, which is described in British patent specification No. 759,560, the contact bed which has a hydrophilic surface is used as a means for intimately mixing the two liquids to obtain a fine dispersion of the hydrocarbon oil in the aqueous alkali metal hydroxide solution. The treating liquid and the hydrocarbon oil are supplied to the contact bed in a ratio by volume of less than 1. In the steady state the ratio by volume in the contact bed of the treating liquid and the hydrocarbon oil is considerably greater than the ratio in which the two liquids are supplied to the contact bed. On discharge from the contact bed the mixture forms two liquid layers that are separated. The hydrocarbon oil layer will contain no occluded traces of the aqueous alkali metal hydroxide solution. The aqueous alkali metal hydroxide solution which will contain a minor quantity of the hydrocarbon oil in a dispersed state is then recycled. A very closely related process is described in a less detailed way in U.S. patent specification No. 2,176,806. It should be noted that both in the process according to U.K. patent specification No. 759,560 and in the process according to U.S. patent specification No. 2,176,806 the specific gravity of the treating liquid is higher than the specific gravity of the liquid to be treated and then in both cases the two liquids are passed through the contact bed in an upward direction.

In these known processes the treating liquid, and sometimes even the treated liquid (cf. U.S. patent specification No. 2,176,806) will contain traces of the other liquid in a finely dispersed form.

It has now been found that the above-mentioned drawbacks may be obviated by employing a contact bed, which is preferentially wetted by the treating liquid, not as a means of dispersing the two immiscible liquids, but as a means of retaining the treating liquid on its surface in the form of a relatively thin film, thus providing a large contact surface for the interaction between the treating liquid and the other liquid. As in the contact bed processes described above the liquid to be treated and the treating liquid are passed through the contact bed in parallel flow, and the ratio by volume of the treating liquid to the liquid to be treated supplied to the contact bed is less than 1.

Thus, the invention relates to a process for the continuous treatment of a first liquid with a second liquid which is immiscible therewith, characterized in that the liquids pass in parallel flow through a contact bed consisting of solid, inert material, which is preferentially wetted by the treating liquid, with the ratio by volume of the treating liquid to the first liquid supplied to the contact bed being less than 1 and with the direction of flow being governed by the relative specific gravities of the two liquids so that the two liquids flow downwardly through the contact bed when the specific gravity of the treating liquid is the larger and flow upwardly when the specific gravity of the treating liquid is less than that of the first liquid; and that both liquids leave the contact bed as continuous phases.

The process according to the invention may be used if components which are present in the one liquid, usually in minor proportion, have to be extracted therefrom by the other liquid. Thus, with the use of the process according to the invention, components may pass from the liquid undergoing treatment to the treating liquid, or from the treating liquid to the liquid undergoing treatment. For example, phenols occurring as contaminations in waste water may be removed therefrom according to the invention by means of an extraction agent such as n-butyl acetate. Such an extraction may be followed by a chemical reaction, so that the method according to the invention is also suitable for use in carrying out reactions in a heterogeneous liquid medium. For instance, according to the invention organic basic nitrogen compounds may be removed from hydrocarbon mixtures, such as gasoline, by means of sulphuric acid, preferably sulphuric acid with a $H_2SO_4$-content above 65% wt. The invention may also be used in removing thiophenols and alkyl phenols from hydrocarbon mixtures such as gasoline, by means of an aqueous solution of an alkali metal hydroxide. The process according to the invention may also be used e.g. in polymerizations or condensations in which the treating liquid has a catalytic effect on the liquid to be treated or components present therein.

In the process according to the invention the internal ratio by volume of the treating liquid to the liquid undergoing treatment may be greater than, equal to or less than 1. The term "internal ratio" indicates the ratio of the amounts of the two liquids that in the steady state are present in the contact bed. Preferably this ratio is between 1.0 and 0.2. In the most preferred embodiment the internal ratio is between 0.5 and 0.2 because in this range only small quantities of the treating liquid are present in the contact bed, making available much space for the liquid undergoing treatment. The installation required may therefore be smaller than that required where the contact bed is used primarily as a means for intimately mixing the two liquids to effect a dispersion of one in another.

The liquids may be passed downwardly or upwardly through the contact bed depending upon the relative specific gravities of the two liquids.

If the specific gravity of the treating liquid is higher than that of the liquid undergoing treatment the two liquids are passed downwardly through the contact bed. Should the two liquids having this relationship between the specific gravities be passed upwardly through the contact bed, the treating liquid, which has a higher specific gravity than the liquid to be treated, tends to accumulate in the lower part of the contact bed and this considerably promotes the tendency towards the formation of dispersions. In fact this is the situation prevailing in the processes according to U.K. patent specification No. 759,560 and U.S. patent specification No. 2,176,806.

If the specific gravity of the treating liquid is lower than that of the liquid undergoing treatment, the two liquids are passed upwardly through the contact bed. If in this case the two liquids would be passed downwardly through the contact bed, the treating liquid, which has a lower specific gravity than the liquid to be treated, tends to accumulate in the upper part of the contact bed. In this case again a dispersion is very easily formed.

In the process according to the present invention it is required that the two liquids leave the contact bed as continuous phases. For this purpose it is essential that the two liquids flow through the contact bed as substantially continuous phases, and this is realized by the treating liquid flowing in the form of a coherent layer (film) over the surface of the contact particles and the liquid undergoing treatment flowing through the interstices between the particles covered with treating liquid, there being no or substantially no dispersion of one liquid in the other. As a consequence of the two liquids being present as two continuous phases in the contact bed, they are still present as continuous phases at the moment that they leave the contact bed. It is only at that moment that droplets will be formed (usually of the treating liquid in the treated liquid) and substantially all droplets thus formed from the continuous phases present at the exit of the contact bed have such large diameters that their velocity of fall is distinctly higher than the velocity of the liquid mixture immediately after leaving the contact bed. This difference in velocities allows a very rapid and substantially complete separation of the two liquids under the mere influence of gravitational forces without the use of expensive separator devices, resulting in two liquids that on visual inspection are entirely clear and free from haze and turbidity.

In the process according to the present invention it is an essential feature that the contact material be preferentially wetted by the treating liquid.

The selection of the material for the contact bed depends on the nature of the two liquids passed through the contact bed. Since these liquids are immiscible one is more polar than the other. If the treating liquid is more polar than the liquid to be treated a contact material having a hydrophilic surface is used in order to ensure preferential wetting. If, on the other hand, the treating liquid is less polar than the liquid to be treated, a contact material having a hydrophobic surface is used to ensure preferential wetting by the treating liquid.

If a treating liquid which is more polar than the liquid to be treated is passed through a contact bed having a hydrophobic surface, the conversion etc., is found to be distinctly lower than in the corresponding case in which a contact bed is preferentially wetted by the treating liquid. Moreover the tendency towards the creation of a dispersion is more pronounced. The same drawbacks are manifest when a treating liquid which is less polar than the liquid to be treated is passed through a contact bed having a hydrophilic surface.

Examples of a contact material having a hydrophilic surface are ceramic materials such as sterchamol, coke that has been cleaned by extraction with an organic solvent, pumice stone, glass and ion-exchanging resins, for example of the polystyrene type. Polythene, polystyrene, Teflon and galena (PbS) are examples of contact materials having a hydrophobic surface. The surface being of interest only in the present connection it is of course possible to use particles consisting of a hydrophilic core and a hydrophobic surface layer or of a hydrophobic core and a hydrophilic surface layer and the like.

As stated above the requirement that the two liquids leave the contact bed as continuous phases, can only be met if they are present as continuous phases in the contact bed and consequently the formation of dispersions of the one liquid in the other in the contact bed should be avoided.

Although in theory many variables might influence the formation of a dispersion, it has been found that only a limited number of variables are of practical importance in the present connection, the influence of the others being negligible.

The variables of any importance in this connection are the viscosities of the two liquids, the interfacial tension between the two liquids, the size and shape of the contact material, the linear velocity of the liquid to be treated, and the volumetric ratio of the two streams fed to the contact bed.

Generally speaking it may be stated that an increase of the linear velocity of the liquid to be treated and/or of the viscosity of the liquid to be treated will increase the tendency to create a dispersion, whereas an increase of the interfacial tension between the two liquids and/or of the viscosity of the treating liquid will decrease this tendency.

It may also be stated that by decreasing the roundness and/or by increasing the surface roughness of the contact material the tendency towards the creation of a dispersion is increased, and that this is also true when the average size of the interstices of the contact bed is lowered by selecting a more finely divided contact material (smaller sizes of the particles).

Increasing the volumetric ratio of the treating liquid and the liquid to be treated ultimately results in the interstices of the contact bed being more or less completely filled with consequent blocking of these interstices for the liquid to be treated. This implies that the liquid to be treated is forced at such a high velocity through the remaining interstices that are not yet filled up with treating liquid that a dispersion is created. On the other hand decreasing this ratio ultimately results in an incomplete covering of the contact material with treating liquid and consequent reduction in available contact surface. However, the volumetric ratio referred to may usually be varied within very wide limits without appreciably influencing the performance of the present process.

From the above it follows that when the initial operating variables are wrongly selected so as to cause dispersion, it is possible to switch over to dispersion-free operation by taking one or more of the following measures:

(a) Decreasing the linear velocity of the liquid to be treated;

(b) Decreasing the viscosity of the liquid to be treated (e.g. by dilution);

(c) Increasing the interfacial tension between the two liquids (e.g. by ensuring the absence of surface-active agents);

(d) By increasing the viscosity of the treating liquid (e.g. in the case of treating of hydrocarbon oils with sulphuric acid by using a more concentrated sulphuric acid);

(e) By increasing the roundness of the contact material (e.g. by replacing jagged contact particles by spheroidal particles);

(f) By decreasing the surface roughness of the contact material (e.g. by selecting a material with a smoother surface);

(g) By increasing the average size of the interstices of the contact bed by utilizing a less finely divided contact material;

(h) By decreasing the volumetric ratio of the treating liquid to the liquid to be treated (provided that this ratio does not become too low which would reduce the available contact surface).

It also follows that it is possible to predict whether, for example, the replacement of a liquid A to be treated by a liquid B to be treated will increase or reduce the tendency towards the formation of a dispersion. Thus, if a kerosine is treated with sulphuric acid under such conditions that there is no dispersion, the substitution of gasoline for the kerosine will be quite safe in view of the lower viscosity, whereas the substitution of gas oil for the kerosine might well result in the formation of a dispersion due to the higher viscosity. In the latter case it would be necessary to compensate for the viscosity effect for example by reducing the linear velocity. Note that in the example just given the influence of the interfacial tension is negligible in comparison to the influence of the viscosity, because gasoline, kerosine and gas oil have approximately the same interfacial tension towards sulphuric acid.

It will be obvious that the viscosities and the interfacial tension between the two liquids are usually fixed by the nature of the liquids and of the treatment to be carried out, hence in practice the measures b, c and d, mentioned above may frequently not be applied either not at all or only to a too limited extent. However, the measures a, e, f, g and h may usually be taken, and this particularly holds for a and g.

In the above the influence of the various variables on the tendency towards the formation of a dispersion has been discussed. However, apart from the requirement that the two liquids should leave the contact bed as continuous phases, there is of course the obvious requirement that in the course of the present process there should be a sufficient extraction and possibly conversion or the like.

Here, too, there are many variables that might influence the degree of extraction, conversion or the like, but again only a few were found to be of any substantial importance.

Considering first those cases that there occurs extraction only and no chemical reaction, it has been found that in addition to the solvent ratio (the vlumetric ratio of the treating liquid to the liquid to be treated), which of course determines the equilibrium distribution of the component(s) to be extracted over the two liquids, the most important variables are the total available contact surface between the two liquids, the viscosities of the two liquids, and to a lesser extent, the linear velocity of the liquid undergoing treatment.

The extraction may be improved by increasing the total available interface, which may be done by simply increasing the height of the contact bed and/or by providing a more finely divided contact material. Moreover, the extraction is sometimes improved by lowering the viscosity of one or both liquids (although in certain cases such a lowering may not result in any change in the extraction). The influence of the linear velocity is usually quite small, provided that this velocity becomes not too high.

The same rules hold for those cases that the extraction if followed by one or more chemical reaction(s), the lowest rate of which is high in comparison with the mass transfer rate that dominates the extraction.

The situation becomes somewhat different in those cases where extraction is followed by one or more chemical reactions and where the reaction rate is not high when compared with the mass transfer rate. In this type of cases the contact time is the dominating variable, and increasing the contact time will result in an improved conversion. The contact time may be improved—other variables remaining constant—by lowering the velocity of the liquid undergoing treatment, by increasing the amount of the treating liquid per unit of space (which can be done e.g. by providing a contact material of smaller particle size) or simply by increasing the height of the contact bed.

It will be realized that for certain variables a certain variation may be beneficial in that it results in a reduction of the tendency towards the creation of a dispersion, but it is harmful in that it reduces the extraction, conversion or the like. However, the primary criterion is that the two liquids should leave the contact bed as continuous phases and this object should first be achieved. Even if this should require certain modifications of the operating conditions that would impair the extraction, conversion or the like, these modifications should be carried out, and this can be more readily done in that any unsatisfactory extraction, conversion or the like can be simply corrected merely by increasing the height of the contact bed, a measure which has no influence on the dispersion tendency.

As compared with the process according to British patent specification No. 759,560 and U.S. patent specification No. 2,176,806 the present process has, due to the specific flow pattern in the contact bed, the advantages of lower pressure gradients, more uniform contact times and a certain degree of staging.

In addition to the above general discussion on the influence of the variables the following more specific information is of interest in the present connection.

In the first place it may be stated that for practical reasons the superficial velocity of the liquid undergoing treatment (i.e. the hypothetical linear velocity as calculated from the throughput per unit of time and from the total cross section of the contact bed) will usually (but not necessarily always) be below 5 cm./sec., even if the limiting value at which dispersion occurs would be higher. If this limiting value should be below 5 cm./sec. for a particular system under particular conditions the superficial linear velocity should of course be lower than said limiting value.

Further it may be stated that the external volumetric ratio of the treating liquid to the liquid to be treated, as supplied to the contact bed, which ratio is always less than 1 in the process according to the present invention will in practice usually be less than 0.2 and in many cases even considerably lower. This shows that with the use of the process according to the present invention a large quantity of the liquid to be treated may be effectively contacted with a very small quantity of treating liquid. The quantity of treating liquid may be practically equal to the quantity theoretically required for the extraction of components from the one liquid by the other liquid and any subsequent reaction. Hitherto it has not been possible to treat a liquid with such a small quantity of a second liquid which is immiscible therewith without one of the liquids entraining the other in dispersed form.

It is advisable that the entire available surface of the contact bed be wetted with the treating liquid. To this end it is best to wet the contact bed in advance with the treating liquid and to spread the latter as uniformly as possible over the entire available surface of the contact material during operation, since if only part of this surface is wetted, the contact surface of the two liquids is smaller than if the entire surface of the contact bed were wetted by the treating liquid. If the quantity of fresh treating liquid supplied to the contact bed per unit of time should become too low to keep the contact material wetted it is of course possible to recycle part of this liquid to the bed.

It is further observed that as with other fixed bed processes it is desirable to have a fairly uniform distribution of the two streams over the cross section of the contact bed, and this may be realized in a conventional way, e.g. by providing special distributing means and/or simply by increasing the height of the contact bed, the additional contact material serving to distribute the feed streams evenly over the cross section of the remaining contact bed. As a consequence of the use of distributing means there may occur a certain extraction, conversion or the like before the liquids enter the contact bed. However, in the present process there should occur at least a substantial degree of extraction, conversion or the like in the contact bed proper.

The contact bed is made of particles of inert material, i.e. the material should not react to any substantial extent with the liquids to be passed therethrough, with the components present therein or with any reaction products formed by contact of the two liquids. The material may, however, show a catalytic effect on one or more of the reactions that may take place in the liquid phases. The contact material particles may have various shapes. Spheres (beads) are usually preferred, but cylindrical particles, Raschig rings, Berl saddles and the like may also be used. Fibrous and filamentous materials are much less suitable and may even be unsuitable.

The particle size of the contact material will usually be in the range of from 0.1 mm. to 30 mm.

It is desirable for the contact surface of the liquids to be as large as possible and hence for the average size of the material to be as small as possible. If, however, the liquids to be contacted contain solid contaminations or if solid products are being formed during passage during the contact bed it would not always be possible to prevent them from clogging the contact bed made up of very fine particles. A contact material having a particle size of from 0.5 to 10 mm. is preferably used, and particle sizes in the range of from 0.5 to 6 mm. are especially preferred.

The contact bed may consist of particles of approximately equal size or of particles of different size. It may, however, also consist of layers each of which is formed by particles of approximately the same size, but in which the particles differ in size from layer to layer. Other arrangements are possible.

The contact bed will as a rule be supported on suitable supporting means, such as a perforated plate or a wide-mesh screen, and may also be covered by suitable covering means. In the present invention the term "contact bed" includes both the contact material and any supporting and/or covering means.

The process according to the invention will now be illustrated with reference to the accompanying schematic drawing, which represents an apparatus that may be used for carrying out the present process. In this drawing the liquid to be treated (e.g. gasoline) is introduced in the reaction vessel 1 through a line 2, which discharges in the upper part of said vessel. Below the discharge opening there is provided a circular plate 3. The liquid flows downwardly through the reaction vessel, passing through the particulate contact bed 4, which is supported on the grid 5 and through the settling zone 6, and leaves the vessel through line 7. The treating liquid (e.g. aqueous NaOH solution) enters the reaction vessel 1 through line 8, which terminates in the distributing head 9, provided with a number of outlet lines 10, serving to distribute the emerging treating liquid droplets 11 in a fairly uniform way over the upper surface of the contact bed. The treating liquid doplets 12 that are formed at the exit of the contact bed have rather large diameters. As a consequence thereof their velocity of fall is much higher than the velocity of the liquid that has been treated, and this causes the droplets to collect in the treating liquid layer 13 rather than being discharged together with the treated liquid through conduit 8. The treating liquid leaves the reaction vessel via line 14.

The apparatus shown in the drawing may be used in those cases that the specific gravity of the treating liquid is larger than that of the liquid to be treated. If the reverse should be true the apparatus should be modified in an appropriate way to enable its use for upflow operations.

The invention will further be illustrated with reference to a number of examples.

Example I

It is known to treat petroleum oil fractions with an aqueous caustic solution for the removal of acidic compounds.

The present example gives the results of a number of experiments in which various petroleum oil fractions and aqueous NaOH-solutions were passed in parallel flow downwardly through a contact bed consisting of glass particles (glass is preferentially wetted by the caustic solution) in an apparatus of the type as illustrated schematically in the attached drawing.

All experiments mentioned in the present example were carried out with a cylindrical contact bed with a cross section of 1 cm.$^2$ and a height of 7 cm. The settling zone below the contact bed had a volume of 5 cm$^3$.

The table below indicates the operating conditions and also the results of the contacting operation in terms of appearance of the two liquids leaving the apparatus and of the extrainment of caustic solution in the hydrocarbon oil phase.

In order to facilitate comparisons the data obtained in experiment 17 are reproduced thrice in the table.

Experiments Nos. 17–20 clearly demonstrate that the tendency towards the creation of a dispersion increases

| Experiment No. | 17 | 18 | 19 | 20 | 21 | 22 | 23 | 24 | 25 | 26 | 27 | 17 | 17 | 28 |
|---|---|---|---|---|---|---|---|---|---|---|---|---|---|---|
| Contact material: Glass beads, diameter, mm | 1 | 1 | 1 | 1 | 1 | 1 | 1 | 1 | 1 | 1 | | 1 | 1 | 0.4 |
| Crushed glass, particle size, mm | | | | | | | | | | | 1 | | | |
| Viscosity of hydrocarbon oil in centistokes at 37.8° C | 3.5 | 3.5 | 3.5 | 3.5 | 3.5 | 2.4 | 1.7 | 1.2 | 3.5 | 3.5 | 3.5 | 3.5 | 3.5 | 3.5 |
| Strength of caustic solution (percent by wt. of NaOH) | 21.9 | 21.9 | 21.9 | 21.9 | 21.9 | 21.9 | 21.9 | 21.9 | 21.9 | 39.8 | 21.9 | 21.9 | 21.9 | 21.9 |
| Dosage of caustic solution, ml./h | 32 | 32 | 32 | 32 | 32 | 32 | 32 | 32 | 32 | 32 | 32 | 32 | 32 | 32 |
| Viscosity of caustic solution in centistokes at 37.8° C | 2.84 | 2.84 | 2.84 | 2.84 | 2.84 | 2.84 | 2.84 | 2.84 | 2.84 | 10.9 | 2.84 | 2.84 | 2.84 | 2.84 |
| Throughput of hydrocarbon phase ml./h | 233 | 300 | 490 | 1,160 | 700 | 700 | 700 | 700 | 735 | 735 | 233 | 233 | 233 | 233 |
| Superficial velocity cm./sec. | 0.07 | 0.09 | 0.14 | 0.34 | 0.2 | 0.2 | 0.2 | 0.2 | 0.21 | 0.21 | 0.07 | 0.07 | 0.07 | 0.07 |
| Entrainment ml. caustic solution per kg. treated hydrocarbon oil | (1) | 1.2 | 4.8 | 8.6 | 6.3 | 3.0 | 0.7 | (1) | 7.0 | (1) | 1.2 | (1) | (1) | 2.5 |
| Appearance of treated hydrocarbon oil | (2) | (3) | (3) | (3) | (3) | (3) | (3) | (2) | (3) | (2) | (3) | (2) | (2) | (3) |
| Appearance of spent caustic solution | (2) | (2) | (2) | (2) | (2) | (2) | (2) | (2) | (2) | (2) | (2) | (2) | (2) | (2) |

$^1$ Nihil.  $^2$ Clear.  $^3$ Very turbid.

if the superficial velocity of the liquid to be treated is increased, and that in these particular circumstances the superficial velocity should be about 0.07 cm./sec. or lower in order to ensure that the two liquids leave the contact bed as continuous phases.

Experiments Nos. 21–24 demonstrate that by increasing the viscosity of the liquid to be treated the tendency towards the creation of a dispersion is increased. In these particular circumstances the viscosity should be about 1.2 centistokes or lower in order to ensure turbidity-free operation.

Experiments Nos. 25 and 26 confirm that an increase of the viscosity of the treating liquid has a favourable influence in that the tendency towards the creation of a dispersion is greatly reduced.

Experiments Nos. 27 and 17 show the influence of the shape and roundness of the contact material and demonstrate the superiority of glass beads over crushed glass particles of the same sieve size.

Finally experiments Nos. 28 and 17 demonstrate that increasing the particle size reduces the tendency towards the creation of dispersions.

From the table it is obvious that experiments Nos. 17, 24, 26 were performed in accordance with the process according to the present invention, whereas the remaining experiments did not satisfy the requirements for the process according to the present invention.

*Example II*

It is known to treat kerosine with an aqueous caustic solution to remove certain undesired compounds which are present therein in minor quantities, viz. thiophenols and alkyl phenols. According to the invention these compounds may be removed by passing the kerosine and the aqueous caustic solution through a contact bed having a hydrophilic surface. Thus in the present experiments kerosine together with an aqueous KOH solution of 20% concentration was passed downwardly through a vertical column with a cross section of 1 cm.$^2$ packed over a length of 7 cm. with glass beads having a diameter of approximately 0.4 mm. The caustic dosage was kept constant at 39 ml./h. as a result of which the contact bed was properly moistened. The flow rate of the kerosine was varied, in order to determine the maximum value thereof below which the kerosine leaves the contact bed in a clear state. The results are summarized in the following table.

| Ratio by volume kerosine/KOH solution | Dosage of KOH solution, ml./h. | Kerosine ml./h. | Superficial velocity of the kerosine, cm./sec. | Appearance of treated kerosine |
|---|---|---|---|---|
| 93 | 39 | 3,640 | 1.02 | turbid, after 1 hour slightly turbid. |
| 84 | 39 | 3,290 | 0.91 | turbid. |
| 56 | 39 | 2,170 | 0.60 | turbid, clear after 30 min. |
| 50 | 39 | 1,960 | 0.54 | turbid, clear after 15 min. |
| 38 | 39 | 1,470 | 0.41 | very slight turbidity, clear after 2–3 min. |
| 23 | 39 | 910 | 0.25 | clear. |

The above shows that with the KOH solution dosage of 39 ml./hour the superficial velocity of the kerosine should not exceed 0.25 cm./sec. with the use of the particular glass beads as contact material.

*Example III*

Kerosine and an aqueous KOH solution of 20% concentration were again passed downwardly through the contact bed of glass beads in a column similar to that used in Example II. The superficial velocity of the kerosine was now kept constant at 0.25 cm./sec., but the ratio of kerosine to KOH solution was varied in order to ascertain at which ratio the liquid to be treated leaves the contact bed when only just clear. The results of the experiments are summarized in the table below.

| Ratio by volume kerosine/KOH solution | Appearance of treated kerosine |
|---|---|
| 8.4 | slightly turbid; clear after 15 minutes. |
| 15 | very slightly turbid; clear after 15 minutes. |
| 18 | clear. |
| 39 | Do. |

The above shows that with a superficial velocity of the kerosine of 0.25 cm./sec. and with the use of the particular glass beads as contact material, the ratio of kerosine to KOH solution should not be lower than 18 as otherwise the kerosine leaving the contact bed would become turbid.

*Example IV*

It is known to treat gasoline with an aqueous caustic solution to remove certain undesired compounds which are present therein in minor quantities, viz. thiophenols and alkyl phenols. According to the invention these compounds may be removed by passing the gasoline and the aqueous caustic solution through a contact bed having a hydrophilic surface.

A vertical column with a cross section of 1 cm.$^2$ was packed over a length of 7 cm. with glass beads having a diameter of approximately 0.4 mm. Gasoline having an alkyl phenol content of 0.34 gram per litre and a thiophenol content of 0.78 gram per litre was continuously fed into the top of the column at a rate of 700 ml. per hour. A 6 N aqueous sodium hydroxide solution was also continuously fed into the top of the column at a rate of 1.5 ml. per hour. The two immiscible liquids flow downward through the contact bed consisting of the glass beads. This bed is preferentially wetted by the aqueous caustic solution as it has a hydrophilic surface.

Both liquids leaving the contact bed were entirely clear. The gasoline had an alkyl phenol content of 0.08 gram per litre and a thiophenol content of 0.1 gram per litre. This is equivalent to a removal of alkyl phenols of 76% of the original content and a removal of thiophenols of 78% of the original content.

*Example V*

In a series of experiments a catalytically cracked gasoline containing thiophenols in an amount corresponding to 270 parts by weight of sulphur per $10^6$ parts by weight of gasoline and alkyl phenols in an amount of 500 parts per $10^6$ parts by weight of gasoline was treated according to the present invention with an aqueous caustic solution. The fresh caustic solution contained 300 grams NaOH per litre. Part of the effluent caustic solution was recycled. The contact bed consisted of glass beads.

The table below summarises various operating conditions as well as the results obtained in the various experiments.

| Experiment No | 101 | 102 | 103 | 104 |
|---|---|---|---|---|
| Dimensions of contact bed: | | | | |
| diameter, mm | 18 | 18 | 18 | 18 |
| height, mm | 70 | 70 | 70 | 175 |
| volume, cm.$^3$ | 17.8 | 17.8 | 17.8 | 44.5 |
| Diameter of glass beads, mm | 0.4 | 2.1 | 2.1 | 2.1 |
| Throughput of gasoline, ml./h | 875 | 875 | 875 | 2,175 |
| Superficial velocity, cm./h | 0.1 | 0.1 | 0.1 | 0.25 |
| Dosage of fresh caustic solution, ml./h | 1.75 | 1.75 | 1.75 | 4.3 |
| Dosage of recycle caustic solution vol. percent on gasoline throughput | 5 | 5 | 20 | 10 |
| Removal of thiophenols, percent | 97.5 | 27.6 | 53 | 95 |
| Removal of alkyl phenols, percent | 80 | 20 | 30 | 80 |

These data show the influence of variations in certain operating conditions on the conversion (removal of thiophenols and alkyl phenols). In all experiments both liquids leaving the contact bed were clear.

Example VI

In a further series of experiments a catalytically cracked gasoline of slightly different composition was again treated with aqueous caustic solution. The gasoline contained thiophenols in an amount equivalent to 200 parts by weight of sulphur per $10^6$ parts by weight of gasoline, and alkyl phenols in an amount of 400 parts per $10^6$ parts by weight of gasoline. The fresh caustic solution contained 300 grams NaOH per litre, part of the effluent caustic solution was recycled. The contact bed consisted of glass beads; in all experiments the diameter thereof was 1 mm.

The various operating conditions and results obtained are given in the table below.

| Experiment No. | 105 | 106 | 107 |
|---|---|---|---|
| Dimensions of contact bed: | | | |
| diameter, mm. | 10 | 10 | 10 |
| height, mm. | 210 | 210 | 210 |
| volume, cm.$^3$ | 16.5 | 16.5 | 16.5 |
| Throughput of gasoline, ml./h | 1,750 | 3,500 | 7,000 |
| Superficial velocity, cm./sec. | 0.6 | 1.2 | 2.4 |
| Dosage of fresh caustic solution, ml./h | 2.3 | 4.6 | 9.2 |
| Dosage of recycle caustic solution, vol. percent on gasoline throughput | 2 | 1 | 1 |
| Removal of thiophenols, percent | 99 | 97 | 95 |
| Removal of alkyl phenols, percent | 85 | 80 | 80 |
| NaOH consumption (percent of amount theoretically required for complete removal of alkyl phenols and thiophenols) | 150 | 150 | 150 |
| Caustic content of treated gasoline (expressed as mg. KOH/l. | | <1 | <1 |

This table shows the influence of variations in the throughput on the conversion.

In all cases the liquids leaving the contact bed were again entirely clear.

*Comparative example (included for reference purposes only).*—The table below gives some data on a conventional two stage mixer-settler operation for the treatment of gasoline with aqueous caustic solutions.

| | |
|---|---|
| "Reactor" | Mixer-settler-mixer-settler-coalescer (volume of each settler 20 m.$^3$ volume of coalescer about 10 m.$^3$). |
| Gasoline throughput, l./h | 93,000. |
| Dosage of fresh caustic solution (300 ml./h.), l./h. | 400. |
| Dosage of recycle caustic solution, vol. percent on gasoline throughput. | 25 (in each stage). |
| Thiophenes removal, percent | 97. |
| Alkylphenols removal, percent | 75. |
| NaOH consumption (percent on theoretical amount required for complete removal of alkylphenols and thiophenes). | 400. |
| Caustic content of treated gasoline (expressed as mg. KOH/l.). | 150 (after 2nd settler), 37 (after coalescer). |
| Appearance of gasoline leaving coalescer. | Very turbid. |

When comparing these data with e.g. those given in Example VI it is obvious that the process according to the present invention is greatly superior, as reflected by the much lower ratio of equipment volume to throughput, the absence of entrainment, the lower caustic consumption and the improved alkylphenol removal.

Example VII

In a further experiment a catalytically cracked light cycle oil was treated with aqueous caustic solution according to the present process. The contact bed consisted of glass beads of 1 mm. diameter. The contact bed had a diameter of 15 mm., a height of 130 mm. and a volume of 23.8 cm.$^3$.

The feed contained thiophenols on an amount equivalent to 212 parts by weight of sulphur per $10^6$ parts by weight of light cycle oil, as well as alkylphenols and other acid compounds in an amount equivalent to an acid value of 270 mg. KOH per kg.

The treating liquid was an aqueous caustic solution, containing 200 kg. NaOH per litre.

The throughput of the light cycle oil was 1 l./h., the superficial velocity 0.16 cm./sec. The dosage of the fresh caustic solution amounted to 4.4 ml./h., whereas an amount of spent caustic solution of 5.8 vol.percent, calculated on cycle oil throughput, was recycled.

The thiophenol removal amounted to 84%, the removal of alkylphenols and other acidic compounds to 78%.

The two liquids left the contact bed in a perfectly clear state.

Example VIII

It is known to treat gasoline with sulphuric acid to remove the minor quantities of undesirable basic nitrogen compounds present therein. By means of this treatment the basic nitrogen compounds are transferred from the gasoline phase to the sulphuric acid phase. In the sulphuric acid phase the basic nitrogen compounds are converted into the corresponding sulphates. According to the invention the treatment of gasoline with sulphuric acid may be carried out by passing the gasoline and the sulphuric acid through a contact bed having a hydrophilic surface.

A vertical column with a cross-section of 1 cm.$^2$ was packed over a length of 7 cm. with glass beads having a diameter of 2.1 mm. Gasoline having a boiling range of 40° C. to 200° C. and a basic nitrogen compound content of 23 m. eq. per litre was continuously fed into the top of the column at a rate of 3500 ml. per hour after the glass beads had been wetted with technical-grade sulphuric acid of 75.3% concentration. Sulphuric acid of 75% concentration was also continuously fed to the top of the column at a rate of 3.6 ml. per hour. The immiscible liquids flow downward through the contact bed consisting of the glass beads. This bed is preferentially wetted by the sulphuric acid as it has a hydrophilic surface.

Clear acid-free gasoline was discharged from the column beneath the contact bed at a rate of 3500 ml. per hour. The basic nitrogen compound content in the discharged gasoline was 0.9 m. eq. per litre, which is equivalent to a removal of basic nitrogen compounds of 61% of the original content thereof. The sulphuric acid containing basic nitrogen compounds in the form of sulphates was discharged as a dark-coloured liquid, free from dispersed gasoline.

*Comparative example (included for reference purposes only).*—The results of the treatment described above were much less satisfactory when the glass beads were replaced by polythene granules. These granules which, like the glass beads, had a diameter of 2.1 mm., were not preferentially wetted by the sulphuric acid but by the gasoline. The gasoline leaving the contact bed was found to contain a finely dispersed nitrogen base sulphate solution, so that the gasoline had to be passed through a coalescer for the removal thereof. The quantity of basic nitrogen compounds removed from the gasoline was also considerably less than with the use of glass beads. Gasoline having a nitrogen content of 1.65 m. eq. per litre was discharged from the column beneath the contact bed of polythene granules; this is equivalent to a removal of only 28% of the quantity of basic nitrogen compounds originally present in the gasoline to be treated.

Example IX

In a further series of experiments with similar feedstock and the same treating solution the influence of the variation of certain operating conditions was investigated. The table below summarizes the major reaction conditions and the results obtained. This table also repeats data for the experiments mentioned in Example VIII and the subsequent comparative example (experiments Nos. 111 and 112).

| Experiment No. | 109 | 110 | 111 | 112 | 113 | 114 | 115 | 116 |
|---|---|---|---|---|---|---|---|---|
| Dimensions of contact bed: | | | | | | | | |
| diameter, cm. | 1,13 | 1,13 | 1,13 | 1,13 | 1,13 | 10 | 30 | 30 |
| height, cm. | 7 | 7 | 7 | 7 | 7 | 25,4 | 50 | 50 |
| volume, cm.$^3$ | 7 | 7 | 7 | 7 | 7 | 2,000 | [1]35 | [1]35 |
| Packing | (2) | (2) | (2) | (3) | (2) | (2) | (2) | (4) |
| Packing size, mm. | 0.4 | 1.0 | 2.1 | 2.1 | 1.0 | 3.0 | 3.0 | 6 |
| Gasoline throughput, litres/h. | 3.5 | 3.5 | 3.5 | 3.5 | 3.5 | 1,000 | 10 m.$^3$ | 10 m.$^3$ |
| Superficial velocity, cm./sec. | 1 | 1 | 1 | 1 | 1 | 3.6 | 4 | 4 |
| Dosage of acid, ml./h. | 3.6 | 3.6 | 3.6 | 3.6 | 6.0 | 1,800 | [1]18 | [1]18 |
| Nitrogen content of feed, p.p.m. | 43 | 43 | 43 | 43 | 43 | 120 | 120 | 120 |
| Nitrogen content of treated gasoline p.p.m. | 2 | 4 | 25 | 31 | 4 | <4 | <4 | 35 |
| Nitrogen removal, percent | 96 | 91 | 61 | 28 | 91 | >97 | >97 | 71 |

[1] Litre.  [2] Glass beads.  [3] Polythene beads.  [4] Ceramic Berl-saddles.

In all experiments (except No. 112) the two liquids left the contact bed in a perfectly clear state.

*Example X*

In all experiments described above in the examples the specific gravity of the treating liquid was larger than that of the liquid to be treated and consequently the two liquids were—in accordance with the present invention—passed in downward direction through the contact bed.

In the present example which related to the extractive removal of phenol from waste water by means of n-butyl acetate the situation is reversed, because here the specific gravity of the treating liquid (n-butyl acetate) is less than the specific gravity of the liquid to be treated (waste water). This implies that—in accordance with the present invention—the two liquids were passed upwardly through the contact bed.

A further difference resided in the fact that the treating liquid was less polar than the liquid to be treated which implied the necessity of the use of a hydrophobic contact material in order to ensure preferential wetting by the treating liquid.

In order to remove the phenol the two liquids were continuously passed upwardly through a column with a cross section of 1.0 cm.$^2$, which over a height of 50 cm. was packed with polythene (poly-ethylene) particles having a particle size ranging from 1 to 2 mm. The waste water was fed to the column at a rate of 512 ml. per hour. The feed contained 87 grams phenol per litre.

The n-butyl acetate was fed to the column at a rate of 51.2 ml. per hour.

Clear water having a phenol content of 18.3 grams per litre was discharged from the top of the column; this is equivalent to a phenol removal of 79%. The n-butyl acetate that left the column was entirely free of any turbidity.

I claim as my invention:

1. A process for the treatment of a first liquid with a treating liquid which has a higher specific gravity and which is immiscible therewith which comprises, (1) passing said liquids concurrently in parallel flow downwardly through a contact bed consisting of solid, inert material which is preferentially wetted by the treating liquid, with the ratio by volume of the treating liquid to the first liquid being less than 1, (2) regulating the quantities of the liquids supplied to the contact bed to maintain a preferential wetting of the bed by the treating liquid thereby providing a large contacting surface for the two liquids without the accumulation of excess treating liquid in the bed, and (3) withdrawing the two liquids from the bed as continuous phases without the dispersion of either liquid in the emerging stream of the other.

2. A process in accordance with claim 1 wherein the treating liquid is an aqueous solution of an alkali metal hydroxide and the first liquid comprises a hydrocarbon mixture.

References Cited in the file of this patent

UNITED STATES PATENTS 2,091,709  Hampton _____ Apr. 31, 1937
2,176,806  Schuessler et al. _____ Oct. 17, 1939